United States Patent
Curlic et al.

(10) Patent No.: US 10,815,836 B2
(45) Date of Patent: Oct. 27, 2020

(54) METHOD FOR MOUNTING AT LEAST ONE SEALING RING ON A CAMSHAFT IN A BEARING LINE OF AN INTERNAL COMBUSTION ENGINE, AND CAMSHAFT HAVING AT LEAST ONE SEALING RING MOUNTED IN SUCH A WAY

(71) Applicants: THYSSENKRUPP PRESTA TECCENTER AG, Eschen (LI); thyssenkrupp AG, Essen (DE)

(72) Inventors: Marko Curlic, Schaanwald (LI); Aaron Pfitscher, Ludesch (AT); Manfred Muster, Ludesch (AT); Kanwar Bir Singh Sidhu, Bodolz (DE); Reinhard Schlemmer, Hohenems (AT)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/465,640

(22) PCT Filed: Nov. 28, 2017

(86) PCT No.: PCT/EP2017/080593
§ 371 (c)(1),
(2) Date: May 31, 2019

(87) PCT Pub. No.: WO2018/099885
PCT Pub. Date: Jun. 7, 2018

(65) Prior Publication Data
US 2019/0309657 A1    Oct. 10, 2019

(30) Foreign Application Priority Data

Dec. 2, 2016 (DE) .......................... 10 2016 224 040

(51) Int. Cl.
*F01L 1/02* (2006.01)
*F01L 1/047* (2006.01)
(Continued)

(52) U.S. Cl.
CPC .......... *F01L 1/047* (2013.01); *B25B 27/0028* (2013.01); *F16J 15/3268* (2013.01);
(Continued)

(58) Field of Classification Search
CPC ... F01L 1/047; F01L 2800/09; F01L 2810/02; F01L 2001/0476; F16J 15/3268; B25B 27/0028
See application file for complete search history.

(56) References Cited

U.S. PATENT DOCUMENTS

| 4,004,443 A | 1/1977 | Gavinet |
| 4,671,696 A | 6/1987 | Suzuki |

(Continued)

FOREIGN PATENT DOCUMENTS

| CN | 103639985 A | 3/2014 |
| CN | 104002274 A | 8/2014 |

(Continued)

OTHER PUBLICATIONS

English Translation of International Search Report issued in PCT/EP2017/080593, dated Mar. 9, 2018.

*Primary Examiner* — Zelalem Eshete
(74) *Attorney, Agent, or Firm* — thyssenkrupp North America, LLC

(57) ABSTRACT

A method for mounting a camshaft in a bearing line of a cylinder head cover of an internal combustion engine may involve mounting a sealing ring in a groove extending radially circumferentially on an outer diameter of the camshaft. The sealing ring may be at least partly formed of an elastically deformable polymer such as polytetrafluoroeth-
(Continued)

ylene (PTFE). The method may further involve sliding a calibrating tool having a rotationally symmetrical opening onto the camshaft or sliding the camshaft into the calibrating tool. A smallest inside diameter of the rotationally symmetrical opening may be greater than an outside diameter of the camshaft in a region of the groove but less than an outside diameter of the sealing ring. Consequently, the sealing ring is pressed into the groove and is frictionally and interlockingly held in the groove.

19 Claims, 6 Drawing Sheets

(51) Int. Cl.
    *B25B 27/00*     (2006.01)
    *F16J 15/3268*     (2016.01)
(52) U.S. Cl.
    CPC ... *F01L 2001/0476* (2013.01); *F01L 2800/09* (2013.01); *F01L 2810/02* (2013.01)

(56) References Cited

U.S. PATENT DOCUMENTS 7,802,549 B2 *   9/2010   Schneider ............... F01L 1/047
                                                                            123/90.6
2007/0067978 A1     3/2007   Relan

FOREIGN PATENT DOCUMENTS

| | | |
|---|---|---|
| CN | 105150160 A | 12/2015 |
| DE | 20 2005 007 805 U | 12/2005 |
| DE | 10 2009 049 217 A | 4/2011 |
| DE | 10 2005 001 225 B | 10/2012 |
| DE | 10 2012 220 652 A | 5/2014 |
| DE | 10 2014 200 642 A | 7/2015 |
| EP | 1 845 238 A | 10/2007 |

\* cited by examiner

METHOD FOR MOUNTING AT LEAST ONE SEALING RING ON A CAMSHAFT IN A BEARING LINE OF AN INTERNAL COMBUSTION ENGINE, AND CAMSHAFT HAVING AT LEAST ONE SEALING RING MOUNTED IN SUCH A WAY

CROSS REFERENCE TO RELATED APPLICATIONS

This application is a U.S. National Stage Entry of International Patent Application Serial Number PCT/EP2017/080593, filed Nov. 28, 2017, which claims priority to German Patent Application No. DE 10 2016 224 040.4, filed Dec. 2, 2016, the entire contents of both of which are incorporated herein by reference.

FIELD

The present disclosure generally relates to camshafts, including methods for mounting sealing rings on camshafts in bearing lines of internal combustion engines.

BACKGROUND

Camshafts are mounted rotatably on a cylinder head of an internal combustion engine under a sealed cylinder head cover in bearings which form a bearing line. A suitable lubricating oil is used for lubrication, and therefore, in addition to the sealing of the cylinder head cover on the cylinder head, sealing elements are also required on a camshaft. For this purpose, sealing rings are fixed on a suitable surface of the camshaft, in particular in the region of an end piece, in each case by an encircling groove formed radially on the surface.

For cost reasons, camshafts are inserted as a whole part into the bearings which form a bearing line. The bearings are generally already closed here, and therefore the camshaft has to be introduced through the openings of the individual bearings.

However, problems arise here with those regions of the sealing rings which protrude over the outer circumference of the camshaft and which may be damaged during the mounting of the camshaft. The excess length is increased by the mounting of the sealing rings on the camshaft since sealing rings expand. The expansion is also not sufficiently reduced by the elasticity on its own. A sealing ring is thereby held in a force- and form-fitting manner in a groove formed on the outer circumferential surface. However, the fixing which can thus be achieved does not sufficiently meet the requirements for a secure sealing action and fastening of the respective sealing ring to the camshaft.

An installation, as previously explained, below the cylinder head cover is likewise not possible here without it being able to be ensured that a sealing ring will not be damaged during the mounting or will not be displaced along the longitudinal axis of the camshaft in such a manner that secure sealing can no longer be achieved.

Thus a need exists for more secure ways in which to mount sealing rings that avoid damage and ensure desirable sealing action.

DETAILED DESCRIPTION

Figure 1:
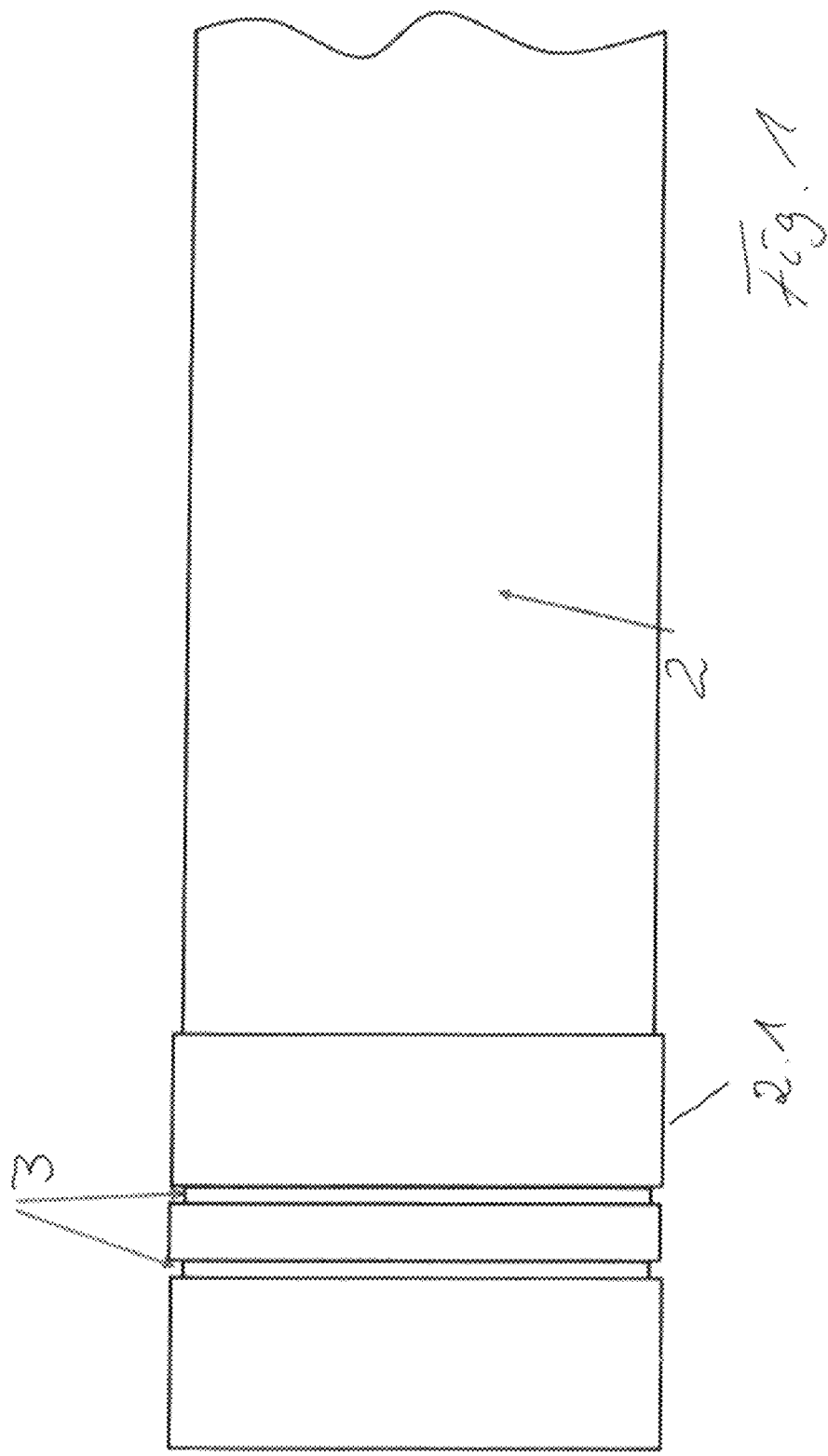
FIG. 1 is a side view of part of an example camshaft without sealing rings.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for mounting at least one sealing ring on a camshaft in a bearing line of an internal combustion engine. The present disclosure also generally relates to camshafts having at least one sealing ring mounted in such a way. In some cases, the at least one sealing ring may be formed by an elastically deformable polymer such as polytetrafluoroethylene (PTFE), for example.

In the method according to the invention, at least one sealing ring which is at least partially formed from an elastically deformable polymer, in particular by polytetrafluoroethylene (PTFE), is pushed onto the outer surface of the camshaft of an internal combustion engine. Two sealing rings are preferably pushed on in a parallel arrangement to each other and are each fixed thereto by a groove. The grooves are arranged here at a distance from one another in the longitudinal direction of the camshaft.

The at least one sealing ring is pushed here onto a region of the camshaft in which a groove encircling radially on the outer diameter of the camshaft is formed, and therefore the respective sealing ring is arranged in the groove. The at least one sealing ring is held in a force- and form-fitting manner in the groove.

During the mounting, in a first alternative, a calibrating tool having a rotationally symmetrical opening, the smallest inside diameter of which is greater than the outside diameter of the camshaft in the region of the respective groove and is smaller than the outside diameter of the at least one sealing ring pushed onto the camshaft in the region of the groove, is pushed over the at least one sealing ring such that the at least one sealing ring is pressed into the respective groove and is held in the groove in a force- and form-fitting manner.

In a second alternative of the invention, during the mounting, pushing of the camshaft into a calibrating tool having a rotationally symmetrical opening, the smallest inside diameter of which is greater than the outside diameter of the camshaft in the region of the respective groove and is smaller than the outside diameter of the at least one sealing ring pushed onto the camshaft in the region of the groove, takes place in such a manner that the at least one sealing ring is pushed into the groove and is held in the groove in a force- and form-fitting manner.

The camshaft can be introduced into the bearings as a bearing line, said bearings being mounted on a cylinder head of the internal combustion engine, and the calibrating tool can be pulled off or stripped off from the camshaft before or during the introduction of the camshaft into the bearing line.

Use can advantageously be made of a calibrating tool which comprises at least one conically tapering region starting from an end side of an opening of the calibrating tool. The inside diameter of the opening on that side of the calibrating tool which is pushed first onto the at least one sealing ring should be greater here than the outside diameter of the at least one sealing ring after the latter has been pushed onto the camshaft.

The conically tapering region can merge into a cylindrical region with a constant inside diameter. The constant inside diameter should correspond to the value which the outside diameter of the sealing ring is intended to have when the camshaft fitted with the sealing ring is mounted. Such a design can be used in an embodiment of the calibrating tool having two oppositely arranged openings.

A calibrating tool having just one opening, into which the region of the camshaft having the groove(s) for fixing the sealing ring(s) can be pushed with the sealing ring(s) pushed thereon, can be formed in a conically tapering manner over the entire length of a frustoconical cavity in the interior of the calibrating tool starting from the then one opening. The smallest inside diameter in said cavity should correspond here to the maximum outside diameter of the sealing ring pressed into the respective groove with the calibrating tool.

The camshaft should be cooled before being introduced into the bearings of the bearing line or before the calibrating tool is pushed on. This can take place on its own or else with the sealing ring(s) already pushed on, and therefore there is the possibility of the camshaft being cooled together with the sealing ring already pushed thereon. During the cooling, a temperature of a maximum −100° C. should be achieved. Cooling can preferably take place by dipping of the camshaft in liquid nitrogen.

There is also the possibility of the camshaft with the at least one sealing ring already pushed thereon being cooled together with the calibrating tool or without the calibrating tool.

In an alternative, the calibrating tool can be pushed over the at least one sealing ring before or after the cooling, and the at least one sealing ring can thereby be pressed deeper into the respective groove. The receptacle which is designed as a cavity or hollow cylinder in the calibrating tool and can be pushed over a respective sealing ring already partially fixed in a groove in a force- and form-fitting manner should be dimensioned with its inside diameter in such a manner that, although a sealing ring is pushed with the calibrating tool deeper into the respective groove, the outer circumferential surface of the sealing ring, in the region of its smallest inside diameter, does not reach the base of the respective groove, and therefore a gap remains between the outer circumference of the respective seal having preferably a circular cross section and the base of the groove. Nevertheless, the respective sealing ring is connected to the corresponding region of the camshaft in the groove sufficiently fixedly and securely in a force- and form-fitting manner.

In the implementation of the method, a structure can be used for the mounting of the sealing ring(s) and the introduction of the camshaft into the bearings of the bearing line, in which the camshaft with the at least one sealing ring already pushed thereon and fixed in the respective groove in a force- and form-fitting manner, upon being introduced into the bearings of the bearing line is pushed by a calibrating tool arranged in front of in front of the first bearing in the introduction direction of the camshaft and, in the process, the at least one sealing ring is pressed deeper into the respective groove.

The at least one sealing ring should be pushed onto a respective groove which is formed in the region of an end piece of the camshaft and should be pressed into said groove with the calibrating tool. An end piece can be part of an integral camshaft or an individual part of an assembled camshaft, said individual part being connected to that part of the camshaft which bears the cams.

The at least one sealing ring should be pressed by means of the calibrating tool into the respective groove to such a depth that at least one 5%, preferably at least 10% of its volume, is arranged outside the groove and protrudes over the surface of the region on which the sealing ring(s) is/are fixed.

The at least one sealing ring should advantageously be pressed with the calibrating tool into the at least one groove to an extent such that the outer circumferential surface of the sealing ring, in the region of its smallest inside diameter, does not reach the base of the respective groove. As a result, damage to the respective sealing ring during the mounting can be avoided and the sealing action which can be achieved by the elastic deformability of the sealing ring can be improved since the sealing ring does not touch the base of the respective groove during the mounting and during the operation of the respective internal combustion engine.

Those having ordinary skill in the art will appreciate that the features described and identified in the individual examples and figures can be combined with one another irrespective of the particular example or the figure. In this vein, individual features are not necessarily restricted to the respective example or the respective figure.

Figure 2:
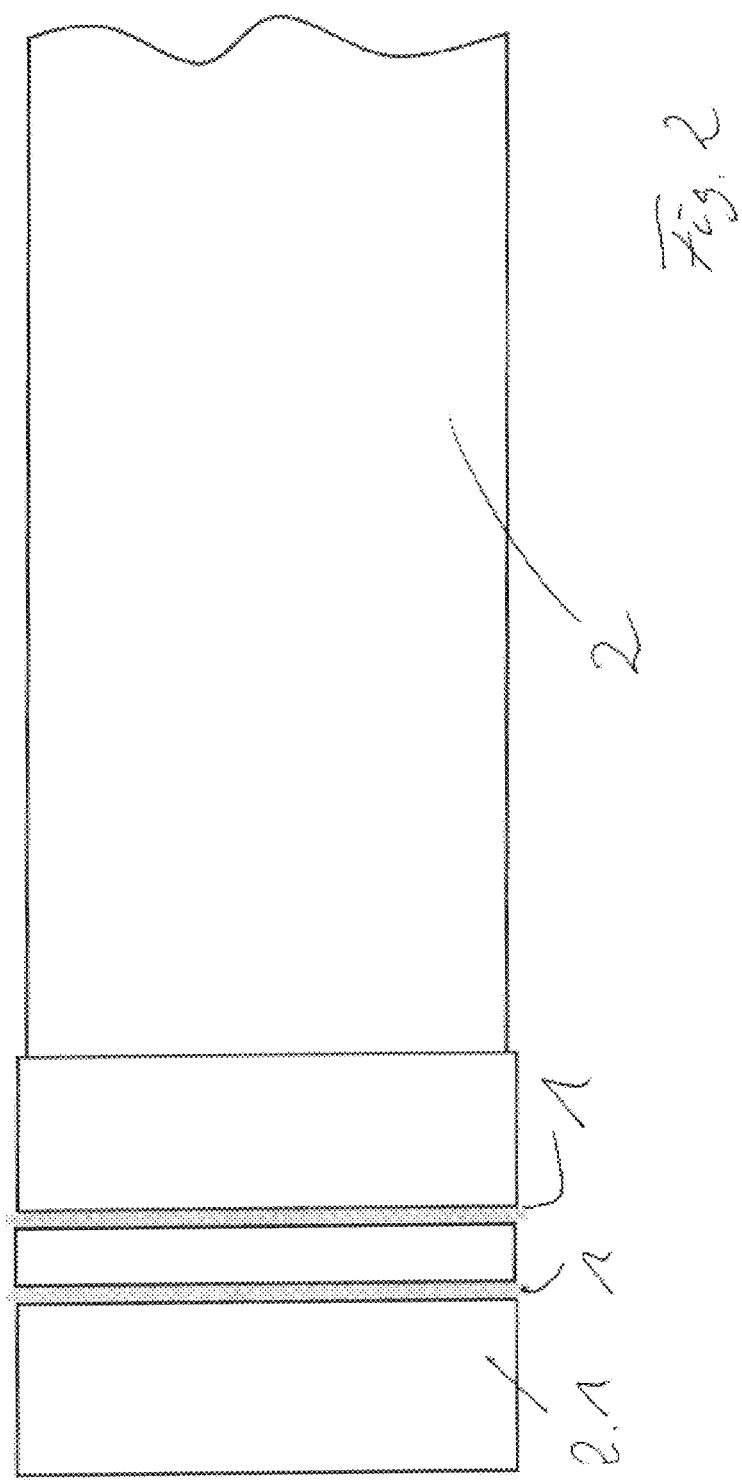
FIG. 2 is a side view of the camshaft of FIG. 1 with preassembled expanded sealing rings.
Figure 3:
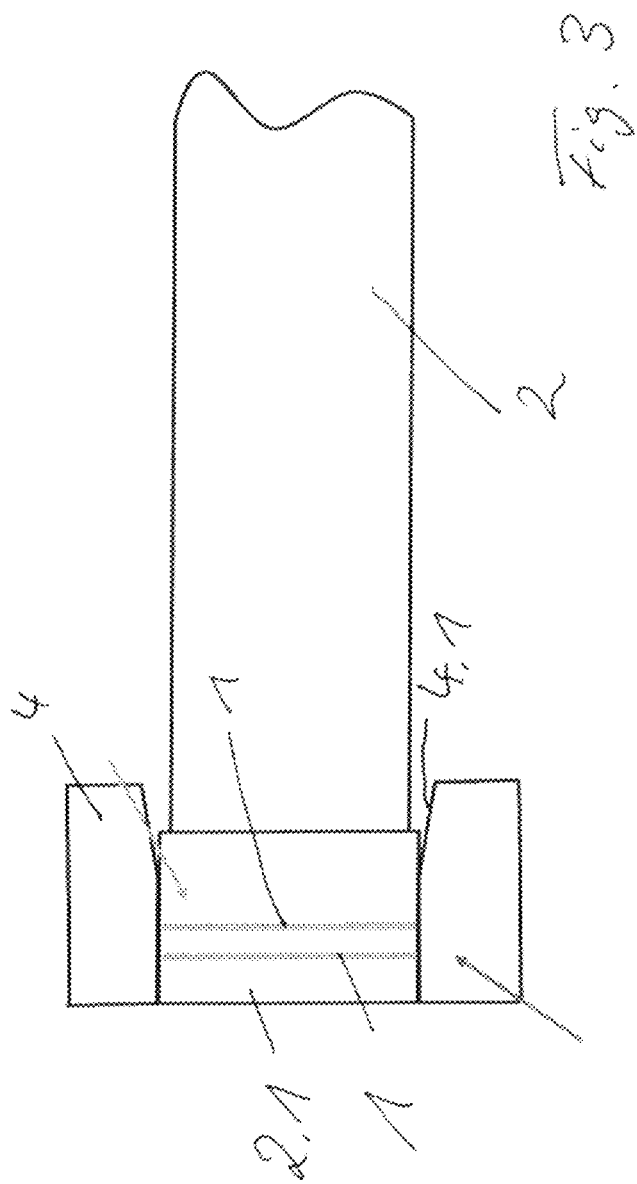
FIG. 3 is a partial side view of the camshaft of FIGS. 1 and 2 with a calibrating tool pushed onto a sealing ring.
Figure 4:
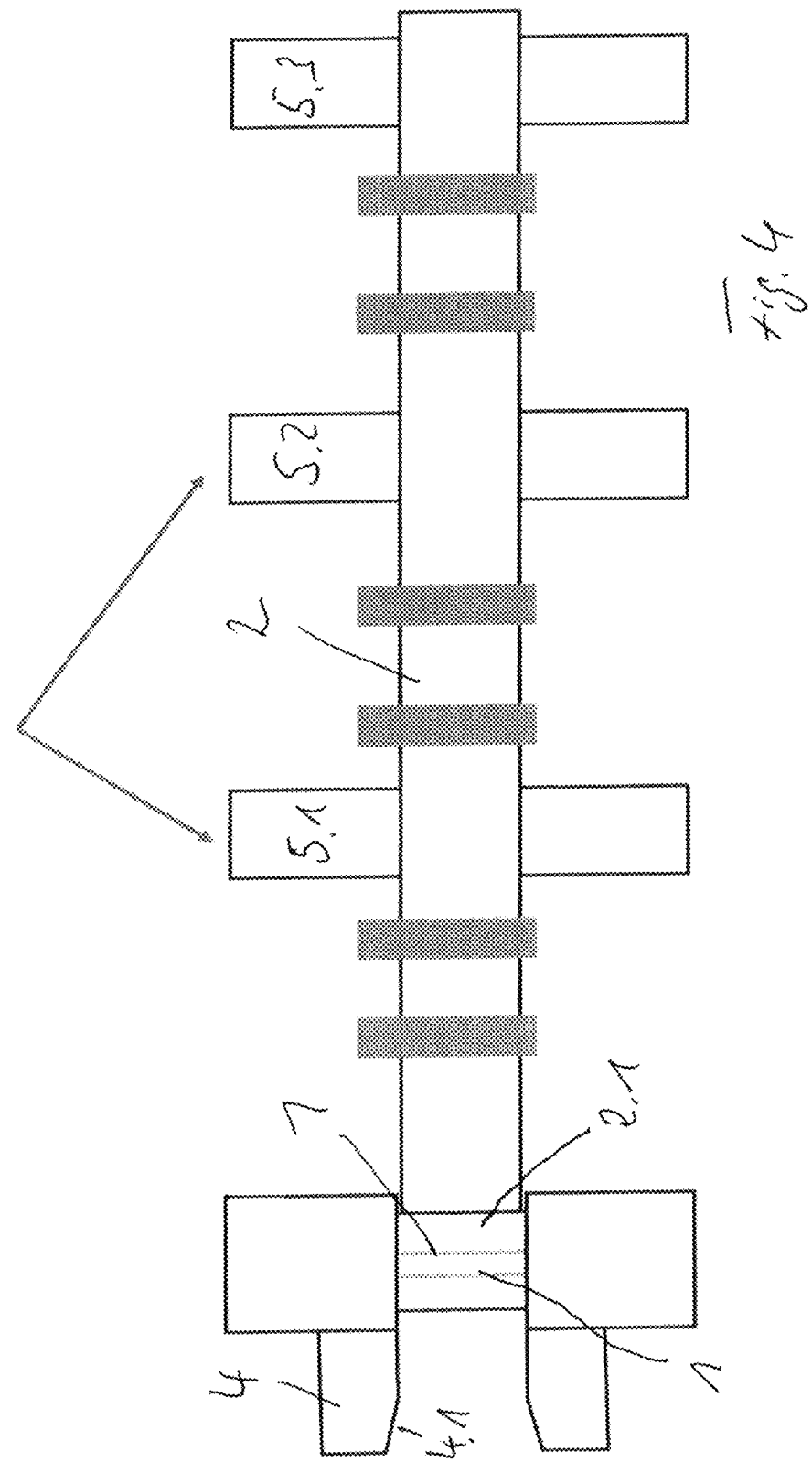
FIG. 4 is a schematic side view of an example camshaft with an end piece with sealing rings and a calibrating tool present during mounting of the camshaft in a bearing line of a cylinder head.
Figure 5:
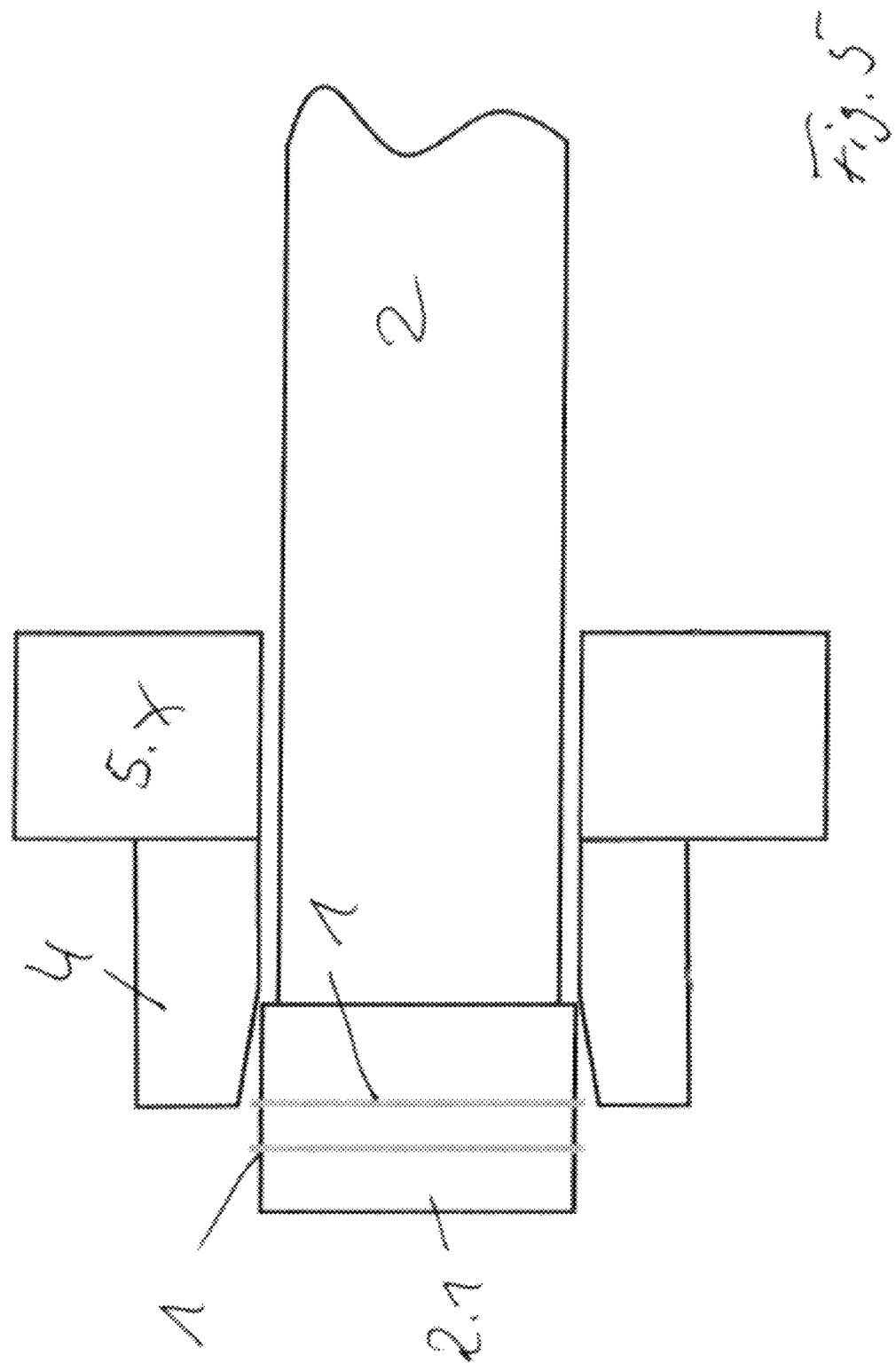
FIG. 5 is a schematic side view of an example calibrating tool disposed on a bearing of a bearing line and with which pressing in of expanded sealing rings can be achieved.
Figure 6:
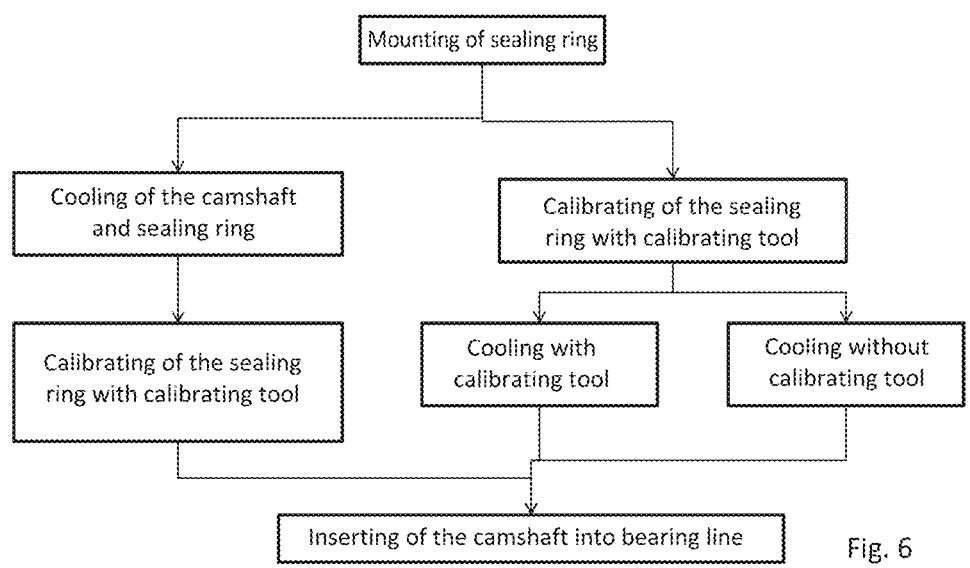
FIG. 6 is a flow diagram of possible sequences for conducting an example method during mounting of at least one sealing ring on a camshaft.

In the figures:

FIG. 1 shows a view of part of a camshaft on an end side without sealing rings;

FIG. 2 shows the illustration from FIG. 1 with preassembled expanded sealing rings;

FIG. 3 shows that part of the camshaft which is shown in FIGS. 1 and 2 with a calibrating tool pushed onto the sealing ring;

FIG. 4 an illustration of a camshaft with an end piece which is provided with sealing rings and at which a calibrating tool is present during the mounting of the camshaft in a bearing line of a cylinder head;

FIG. 5 shows, in schematic form, a calibrating tool which is arranged on a bearing of a bearing line and with which pressing in of expanded sealing rings can be achieved;

FIG. 6 shows, in schematic form, an illustration of possible sequences for conducting the method during the mounting of at least one sealing ring on a camshaft.

FIG. 1 shows part of a camshaft 2, on the one end side of which an end piece 2.1 is part of the camshaft 2 or the end piece 2.1 is connected to the camshaft 2. In the region of the end piece 2.1, two parallel grooves 3 are formed in a radially encircling manner perpendicular to the longitudinal axis of the camshaft 2.

In the illustration of FIG. 2, two sealing rings 1 made of PTFE have been pushed onto the end piece 2.1 from the side shown on the left here to such an extent that the sealing rings 1 are also held in the respective groove 3 in a form-fitting manner, but protrude to too high an extent over the outer surface in the region of the end piece 2.1. The elastic sealing rings 1 have expanded upon being pushed on.

By the calibrating tool 4 being pushed from one side onto the region of the end piece 2.1 of the camshaft 2, the sealing rings 1 are pressed deeper into the respective groove 3. In the example shown in FIG. 3, the calibrating tool 4 comprises a hollow cylinder. In the example shown in FIG. 3, the inner side of the calibrating tool 4 comprises, on the end side which is pushed first onto the end piece 2.1 and the sealing rings 1, a conically tapering region 4.1, the largest inside diameter of which is arranged on the end side which is pushed first onto the end piece 2.1. The conically tapering region 4.1 is adjoined by a region at which its inside diameter is constant and with the smallest inside diameter which in turn corresponds to the largest outside diameter of the sealing rings 1 and which the sealing rings 1 are intended to have during the mounting of the camshaft 2 in the bearing line. The region of the calibrating tool 4 with the constant inside diameter has a width in the direction of the longitudinal axis of the camshaft 2, with which it can be ensured that all of the sealing rings 1 are pressed into the respective groove 3 to a corresponding depth when the calibrating tool 4 has been pushed onto the end piece 2.1 and the sealing rings 1.

By the calibrating tool 4 being pushed on, the sealing rings are pressed deeper into the grooves 3 to such an extent that they protrude with their outer diameter over the outer surface of the end piece 2.1 and do not touch the base of the respective groove 3.

The arrow in FIG. 3 is intended to clarify the direction of movement of the calibrating tool 4 as the latter is being pushed onto the respective sealing ring 1, by means of which direction of movement the respective sealing ring 1 can be introduced in a defined manner in to the corresponding groove 3 and fixed therein in a form-fitting and force-fitting manner.

FIG. 4 shows in schematic form a view of a camshaft 2 which has been pushed into the bearing line, formed by the bearings 5.1, 5.2 and 5.3, of an internal combustion engine, here from the left to the right. The two sealing rings 1 which are fixed in the grooves 3 of the end piece 2.1 have been pressed by means of the calibrating tool 4 deeper into the respective groove 3 after being pushed on and correspondingly expanding.

After the mounting of the camshaft 2, the calibrating tool 4 can be pulled off again. The pulling off during the mounting of the camshaft 2 can be assisted by one of the bearings 5.x, against which the calibrating tool 4 abuts upon introduction of the camshaft 2 into the bearing line, and is thereby stripped off. This state of affairs is not illustrated in FIG. 4.

FIG. 5 shows an example in which a calibrating tool 4 is supported on one of the bearings 5.x during the mounting of a camshaft 2 in the closed bearing line.

However, a calibrating tool 4 can also be correspondingly moved by a manipulator unit (not shown) such that pushing on and pulling off are possible.

FIG. 6 shows various possibilities for the mounting of at least one sealing ring on a camshaft. A camshaft with or without a sealing ring already mounted can be cooled prior to the introduction into the bearing line of an internal combustion engine, as is mentioned in the general part of the description.

The cooling of the camshaft can also take place with the at least one sealing ring already mounted, together with the calibrating tool or after the calibrating tool is pulled off before the camshaft is mounted in the bearing line of the internal combustion engine.

What is claimed is:

1. A method for mounting a camshaft in a bearing line of a cylinder head cover of an internal combustion engine, the method comprising:
   mounting a sealing ring on the camshaft by positioning the sealing ring in a groove that radially encircles an outer diameter in a region of the camshaft, the sealing ring comprising an elastically deformable polymer; and
   positioning a calibrating tool relative to the sealing ring, wherein the calibrating tool has a rotationally symmetrical opening, wherein a smallest inside diameter of the rotationally symmetrical opening is greater than the outer diameter of the camshaft in the region of the camshaft but is less than an outside diameter of the sealing ring, wherein the calibrating tool is pushed over the sealing ring or the camshaft is pushed into the calibrating tool such that the sealing ring is pressed into and held in the groove in a force-fitting and form-fitting manner.

2. The method of claim 1 wherein the sealing ring comprises polytetrafluoroethylene (PTFE).

3. The method of claim 1 comprising introducing the camshaft into bearings of the bearing line, wherein the bearings are mounted on a cylinder head of the internal combustion engine.

4. The method of claim 3 comprising pulling or stripping the calibrating tool off the camshaft before or during the introduction of the camshaft into the bearing line.

5. The method of claim 3 comprising cooling the camshaft before introducing the camshaft into the bearings of the bearing line.

6. The method of claim 3 wherein upon introducing the camshaft into the bearings, the camshaft with the mounted sealing ring is pushed by the calibrating tool disposed in front of a first of the bearings in an introduction direction of the camshaft, thereby pressing the sealing ring deeper into the groove such that the sealing ring is held in the groove in the force-fitting and form-fitting manner.

7. The method of claim 1 wherein the calibrating tool includes a conically tapering region that starts at a first side of an opening of the calibrating tool, wherein the first side of the opening of the calibrating tool is pushed onto the sealing ring first, wherein an inside diameter of the opening at the first side is greater than the outside diameter of the sealing ring after the sealing ring has been positioned in the groove.

8. The method of claim 1 comprising cooling the camshaft before positioning the calibrating tool relative to the sealing ring.

9. The method of claim 1 comprising cooling the camshaft before mounting the sealing ring.

10. The method of claim 1 wherein after the sealing ring is mounted on the camshaft, the method comprises cooling the camshaft and the sealing ring together.

11. The method of claim 1 comprising:
    pushing the calibrating tool over the sealing ring, which presses the sealing ring deeper into the groove; and then
    cooling the camshaft.

12. The method of claim 1 comprising:
cooling the camshaft; and then
pushing the calibrating tool over the sealing ring, which presses the sealing ring deeper into the groove.

13. The method of claim 1 wherein the calibrating tool presses the sealing ring into the groove to an extent such that an outer circumferential surface of the sealing ring, in a region of its smallest inside diameter, does not reach a base of the groove.

14. The method of claim 1 comprising cooling the camshaft with the mounted sealing ring and the calibrating tool.

15. The method of claim 1 comprising cooling the camshaft with the mounted sealing ring but without the calibrating tool.

16. The method of claim 1 wherein the sealing ring is a first sealing ring and the groove is a first groove, the method comprising positioning a second sealing ring in a second groove on the camshaft in a force-fitting and form-fitting manner such that the second sealing ring is spaced apart from the first sealing ring along a longitudinal axis of the camshaft.

17. The camshaft referenced in claim 1 wherein the sealing ring is disposed in the groove in the form-fitting and force-fitting manner, where the sealing ring is disposed in the groove according to the method recited in claim 1.

18. A method for mounting a camshaft in a bearing line of a cylinder head cover of an internal combustion engine, the method comprising:
mounting a polytetrafluoroethylene (PTFE) sealing ring on a groove of the camshaft; and
positioning a calibrating tool relative to the sealing ring, wherein a smallest inside diameter of an opening of the calibrating tool is greater than an outer diameter of the camshaft in a region adjacent to the groove but is less than an outside diameter of the sealing ring, wherein the calibrating tool is pushed over the sealing ring or the camshaft is pushed into the calibrating tool such that the opening of the calibrating tool presses the sealing ring into the groove in a force-fitting and form-fitting manner.

19. The method of claim 18 wherein positioning the calibrating tool relative to the sealing ring comprises passing the sealing ring through a conically tapering region of the opening of the calibrating tool.

* * * * *